(12) United States Patent
Naganuma et al.

(10) Patent No.: US 6,981,807 B2
(45) Date of Patent: Jan. 3, 2006

(54) ELECTROMAGNETIC DRIVE DEVICE AND LIGHT QUANTITY ADJUSTMENT DEVICE USING THE SAME

(75) Inventors: Hiroaki Naganuma, Kofu (JP); Tetsuyuki Tohyama, Yamanashi-ken (JP)

(73) Assignee: Nisca Corporation, Yamanashi-Ken (JP)

( * ) Notice: Subject to any disclaimer, the term of this patent is extended or adjusted under 35 U.S.C. 154(b) by 134 days.

(21) Appl. No.: 10/800,729

(22) Filed: Mar. 16, 2004

(65) Prior Publication Data

US 2004/0223755 A1    Nov. 11, 2004

(30) Foreign Application Priority Data

May 9, 2003    (JP) .............................. 2003-132024

(51) Int. Cl.
*G03B 9/08* (2006.01)
*H02K 33/00* (2006.01)

(52) U.S. Cl. ..................... 396/463; 310/37; 310/194; 310/254

(58) Field of Classification Search ............... 396/463, 396/469, 508
See application file for complete search history.

(56) References Cited

U.S. PATENT DOCUMENTS

| 5,262,812 A | * | 11/1993 | Fukasawa | .................. 396/455 |
| 6,726,380 B2 | * | 4/2004 | Watanabe et al. | ........... 396/463 |
| 2004/0222709 A1 | * | 11/2004 | Naganuma et al. | ........... 310/36 |

FOREIGN PATENT DOCUMENTS

JP    2606159    7/2000

* cited by examiner

*Primary Examiner*—W. B. Perkey
(74) *Attorney, Agent, or Firm*—Manabu Kanesaka

(57) ABSTRACT

An electromagnetic drive device includes a coil frame with a hollow tubular shape, a magnet rotor disposed in the coil frame to be rotatable through a rotational shaft, a transmission arm attached to the rotational shaft for outputting a rotation of the magnet rotor to an outside, and a coil wound around an outer periphery of the coil frame. The tubular coil frame is divided laterally in a direction perpendicular to the rotational shaft, and is formed of two bobbin members. The transmission arm is attached to the rotational shaft in a state approximately perpendicular to the rotational shaft. An opening is provided in one of the bobbin members in a peripheral side surface at a location different from a connection surface contacting the other of the bobbin members, so that the transmission arm protrudes to an outside of the coil frame through the opening.

5 Claims, 4 Drawing Sheets

ELECTROMAGNETIC DRIVE DEVICE AND LIGHT QUANTITY ADJUSTMENT DEVICE USING THE SAME

BACKGROUND OF THE INVENTION AND RELATED ART STATEMENT

The present invention relates to an electromagnetic drive device in which a magnet rotor formed of permanent magnet is rotatably accommodated in a coil frame with a coil wound around an outer periphery thereof so that the magnet rotor rotates when a direct current is supplied to the coil, and a light quantity adjustment device for adjusting a light quantity of an optical image pick-up device with a torque generated by the magnet rotor.

Generally, as disclosed in Japanese Utility Model No. 2606159, in an optical device such as a video camera and a still camera, a shutter blade member is provided in a lens-barrel with an image pick-up lens for blocking light or a stop blade member is provided for adjusting a quantity of light. The blade member is incorporated in the lens-barrel on an image pick-up optical axis to be rotatable or slidable, and is controlled by an electromagnetic drive device.

In such an electromagnetic drive device, a magnet rotor is rotatably accommodated inside a coil frame with a conductive coil wound around an outer periphery thereof, and a rotation of the magnet rotor is transmitted to the blade member to adjust the photographing optical axis by increasing and decreasing an aperture diameter. There has been widely used a structure in which a magnet rotor is polarizes in two poles N and S, and a magnetic field is generated in the coil to rotate the rotor when a direct current is supplied to a coil.

In the electromagnetic drive device, the hollow tubular coil frame is formed of a resin and so forth, and the magnet rotor having a rotational shaft is rotatably supported and accommodated in the coil frame. A torque is transmitted to the blade member from the rotational shaft through a transmission arm. The coil frame has a structure divided into two portions so that the magnet rotor is accommodated therein. After the rotor is accommodated in the coil frame, the two portions are joined, and the coil is wound around an outer periphery of the coil frame. The coil frame may be divided left and right into two portions in a longitudinal direction through the rotational shaft of the magnet rotor or may be divided laterally up and down into two portions in a direction perpendicular to the rotational shaft.

When the coil frame is divided left and right into two portions in a longitudinal direction, the coil can not be wound around a joint line (connection surfaces) of the two coil frame halves, so that a coil winding part is provided in each of the two coil frame halves for winding the coil. Accordingly, the coil is wound around each of the coil winding parts except the connection surfaces at a center of the coil frame, thereby increasing a size of the device.

The invention is directed to an improved structure of a coil frame laterally divided up and down into two portions as disclosed in Japanese Utility Model No. 2606159, while solving a problem described above. In the conventional device, after the cup-shaped coil frame halves divided up and down into two portions are joined, the magnet rotor is accommodated in a hollow tube portion of the coil frame, and the coil is wound around an outer periphery of the coil frame, thereby integrally assembling the device. The magnet rotor is integrally provided with a rotational shaft at a center of a cylindrical magnet, and the rotational shaft is supported through bearing holes formed in the coil frame halves. A transmission arm is attached to the rotational shaft of the magnet rotor in a direction perpendicular to the rotational shaft, and protrudes to an outside from an opening formed in a peripheral side surface of the coil frame.

As described above, when the coil frame halves formed in the cup-shaped shape are joined and the transmission arm perpendicularly attached to the rotational shaft of the magnet rotor protrudes from the peripheral side surface to the outside, there is the following problem. Conventionally, as disclosed in Japanese Utility Model No. 2606159, concave notch parts are provided in the joint surfaces (connection surfaces) of the coil frame halves, and a window opening is formed of the two notch parts, so that the transmission arm protrudes to the outside. However, when joint portions (contact portions) and the notched portions (window opening) are provided in the joint surfaces (flange parts) of the coil frame halves, a positional misalignment tends to occur when the two coil frame halves are joined. Especially, a size of the device has been reduced recently, and a diameter of the coil frame has been reduced to 4 mm. Accordingly, the joint portions of the coil frame halves have been reduced to about 8 mm, so that it is difficult to accurately join the coil frame halves.

In addition to such a problem, when the coil wound around the outer periphery of the coil frame is contracted due to a change in an ambient temperature or with time, a strong tightening force is applied to the concave notch portions. Accordingly, a shape of the opening deforms to reduce an operational range of the transmission arm, so that the shutter blade may not be closed completely, or the stop device may not set a light quantity correctly.

These problems are apparent when a device has a coil frame with a thickness of about 1 mm. When the coil wound around the outer periphery of the coil frame is contracted due to a change in an ambient temperature or an impact applied on the coil in use, a shape of the opening deforms.

In view of the problems described above, an object of the invention is to provide an electromagnetic drive device in which coil frame halves are joined without a positional misalignment and an operational range of the transmission member is not reduced by the structure such that joint portions of coil frame halves and an opening for protruding a transmission arm outwardly are formed at different locations.

Another object of the invention is to provide a light quantity adjustment device such as a shutter device and a stop device, in which an operation thereof is not affected by an external impact or a change in an ambient temperature.

Further objects and advantages of the invention will be apparent from the following description of the invention.

SUMMARY OF THE INVENTION

In order to achieve the objects described above, a coil frame with a hollow tubular shape is divided into two bobbin members. The coil frame is provided with a flange surface for connecting the bobbin members when the bobbin members are joined to form the coil frame at a location different from a location where the coil frame is provided with an opening for protruding a transmission arm accommodated inside the coil frame.

More specifically, according to a first aspect of the present invention, an electromagnetic drive device includes the coil frame with a hollow tubular shape; a magnet rotor disposed in the coil frame to be rotatable through a rotational shaft; a transmission arm attached to the rotational shaft for outputting a rotation of the magnet rotor to an outside; and a coil wound around an outer periphery of the coil frame. The tubular coil frame is divided in a direction perpendicular to the rotational shaft, and is formed of the two bobbin members. The transmission arm is attached to the rotational shaft in a state approximately perpendicular to the rotational shaft. The opening is provided in one of the bobbin members in a peripheral side surface at a location different from that of a connection surface contacting that of the other of the bobbin members, so that the transmission arm protrudes to an outside of the coil frame through the opening. Accordingly, it is possible to join the upper and lower bobbin members over a whole area of outer peripheries thereof, so that the bobbin members are correctly connected without positional misalignment. Further, the transmission arm protrudes to an outside from an optimum location, i.e. a vicinity of a light quantity adjustment blade of a camera device and so forth at a position different from that of the connection surface.

According to a second aspect of the present invention, in the electromagnetic drive device of the first aspect of the invention, a bearing part is formed in one of the bobbin members of the coil frame for supporting one end of the rotational shaft of the magnet rotor, and a bearing part is formed in the other of the bobbin members for supporting the other end of the rotational shaft, respectively, so that the magnet rotor is pivotally supported to rotate smoothly.

According to a third aspect of the present invention, an electromagnetic drive device include a hollow tubular coil frame; a magnet rotor disposed in the coil frame to be rotatable through a rotational shaft; a transmission arm attached to the rotational shaft for outputting a rotation of the magnet rotor to an outside; and a coil wound around an outer periphery of the coil frame. The tubular coil frame is formed of a first bobbin member having an upper end surface and a peripheral side surface partitioned through the rotational shaft, and a second bobbin member having a lower end surface and a peripheral side surface partitioned through the rotational shaft. An opening is provided in at least one of the bobbin members in the peripheral side surface at a location different from that of a connection surface contacting the other of the bobbin members. The transmission arm is attached to the rotational shaft in a state approximately perpendicular to the rotational shaft, and protrudes to an outside of the coil frame through the opening. Accordingly, each of the two bobbin members has an approximately L-shape section or a reverse approximately L-shape section, and has the upper end surface or the lower end surface where the coil is wound and the peripheral side surface partitioned with the rotational shaft as a boundary. The transmission arm of the magnet rotor is simply inserted into the opening formed in one of the bobbin members, so that a manufacture of the device is easy.

According to a fourth aspect of the present invention, a light quantity adjustment device includes a base plate having an optical axis aperture; a blade member attached to the base plate for adjusting a quantity of light passing through the optical axis aperture; a hollow tubular coil frame attached to the base plate; a magnet rotor disposed in the coil frame to be rotatable through a rotational shaft; a transmission arm attached to the rotational shaft for transmitting a rotation of the magnet rotor to the blade member; and a coil wound around an outer periphery of the coil frame. The tubular coil frame is formed of two bobbin members, and is divided up and down in a direction perpendicular to the rotational shaft. An opening is provided in one of the bobbin members in a peripheral side surface thereof at a location different from that of a connection surface contacting the other of the bobbin members. The transmission arm is attached to the rotational shaft in a state approximately perpendicular to the rotational shaft, and protrudes to an outside of the coil frame through the opening. Accordingly, when the light quantity adjustment device is incorporated into a camera device and the like, the transmission arm operates smoothly regardless of an ambient temperature or an impact during use.

According to a fifth aspect of the present invention, a light quantity adjustment device includes a base plate having an optical axis aperture; a blade member attached to the base plate for adjusting a quantity of light passing through the optical axis aperture; a hollow tubular coil frame attached to the base plate; a magnet rotor disposed in the coil frame to be rotatable through a rotational shaft; a transmission arm attached to the rotational shaft for transmitting a rotation of the magnet rotor to the blade member; and a coil wound around an outer periphery of the coil frame. The tubular coil frame is formed of a first bobbin member having an upper end surface and a peripheral side surface partitioned through the rotational shaft, and a second bobbin member having a lower end surface and a peripheral side surface partitioned through the rotational shaft. An opening is provided in at least one of the bobbin members in the peripheral side surface at a location different from that of a connection surface contacting the other of the bobbin members. The transmission arm is attached to the rotational shaft in a state approximately perpendicular to the rotational shaft, and protrudes to an outside of the coil frame through the opening. Accordingly, each of the two bobbin members has an approximately L-shape section or a reverse approximately L-shape section, and has the upper end surface or the lower end surface where the coil is wound and the peripheral side surface partitioned with the rotational shaft as a boundary. The transmission arm of the magnet rotor is simply inserted into the opening formed in one of the bobbin members, so that the magnet rotor is easily disposed in the coil frame and the transmission arm operates smoothly in use.

DETAILED DESCRIPTION OF PREFERRED EMBODIMENTS

Figure 1:
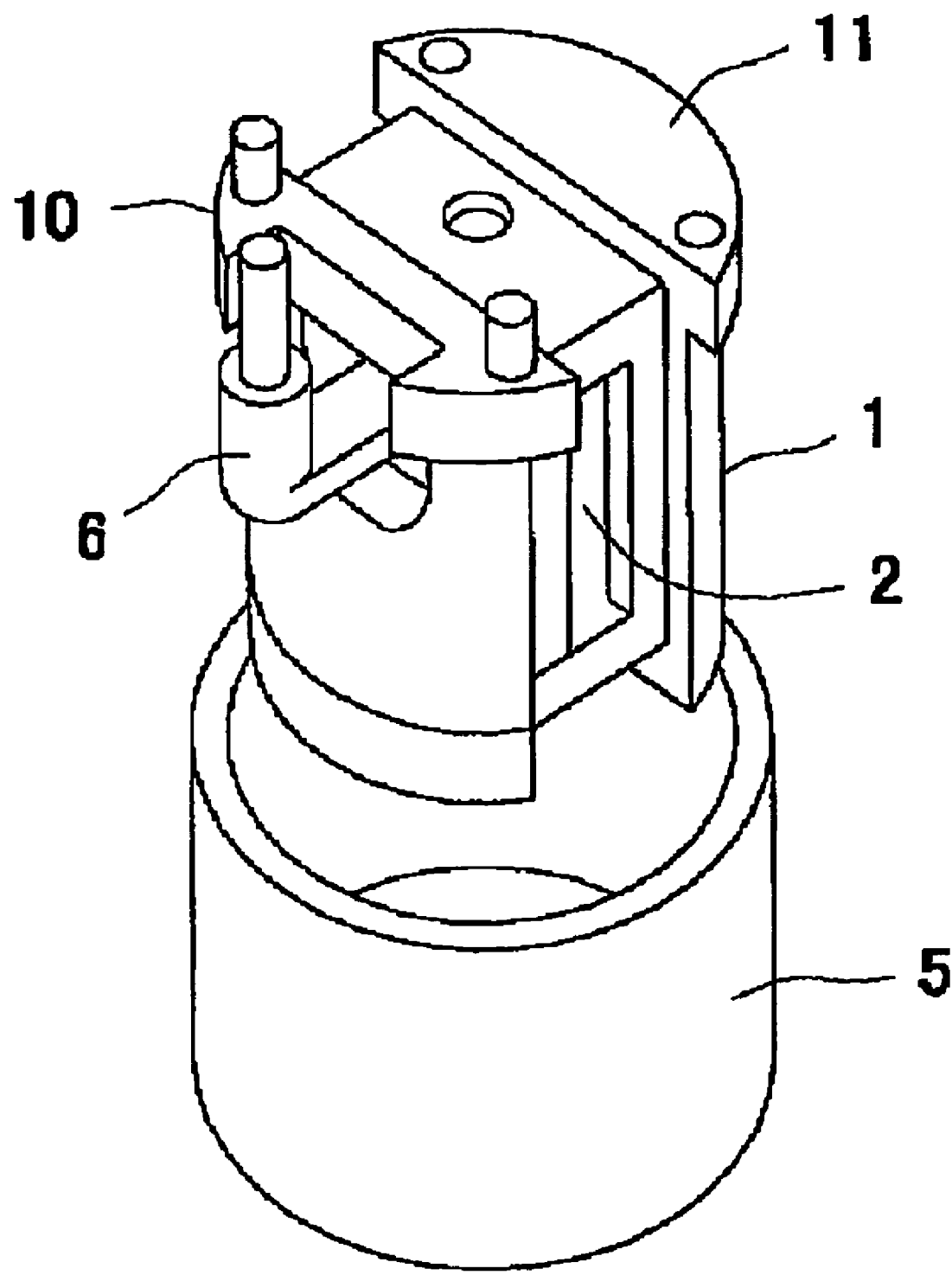
FIG. 1 is a perspective view showing a main part of an electromagnetic drive device according to an embodiment of the invention.
Figure 2:
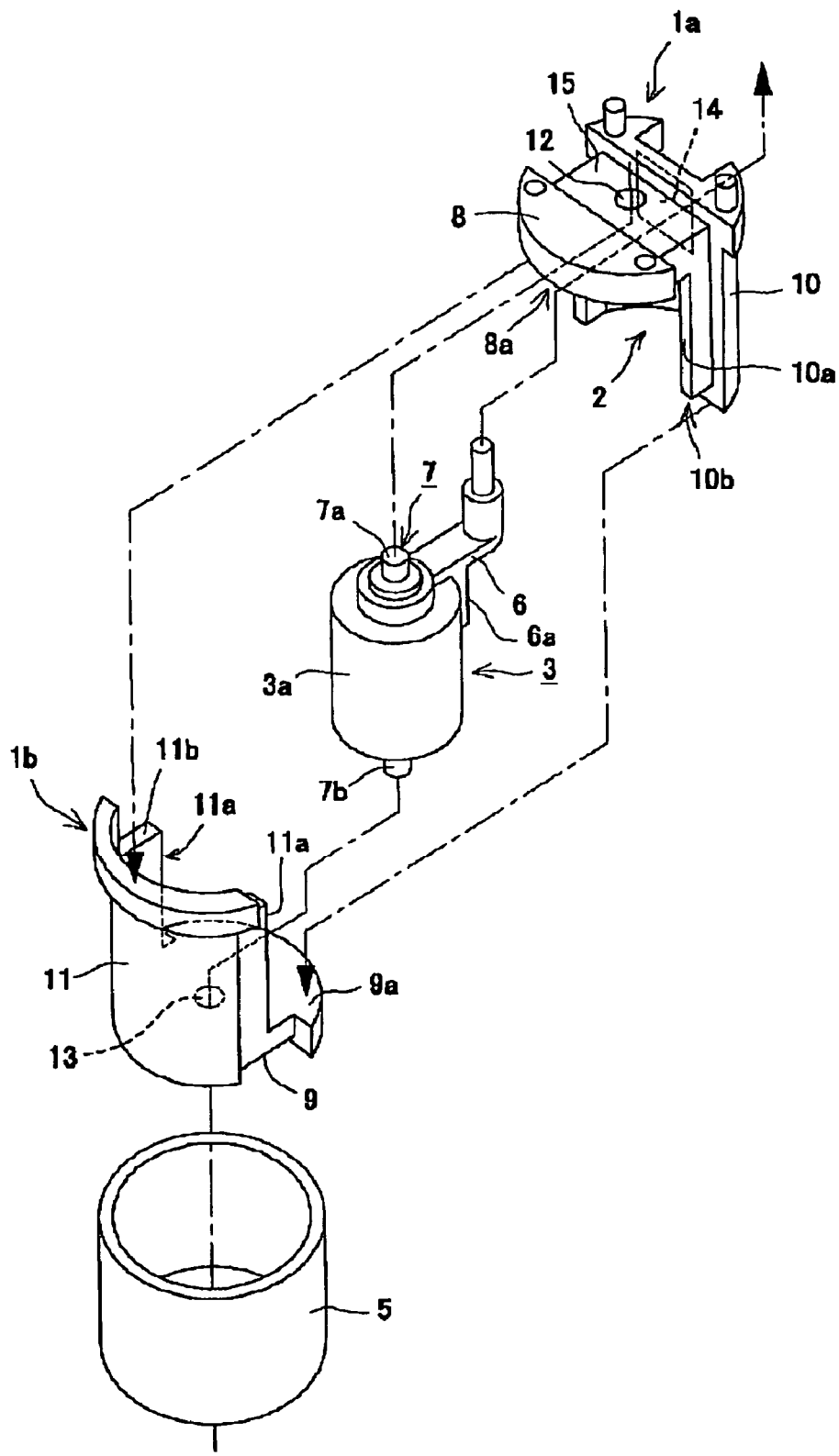
FIG. 2 is an exploded perspective view showing the electromagnetic drive device shown in FIG. 1.
Figure 3:
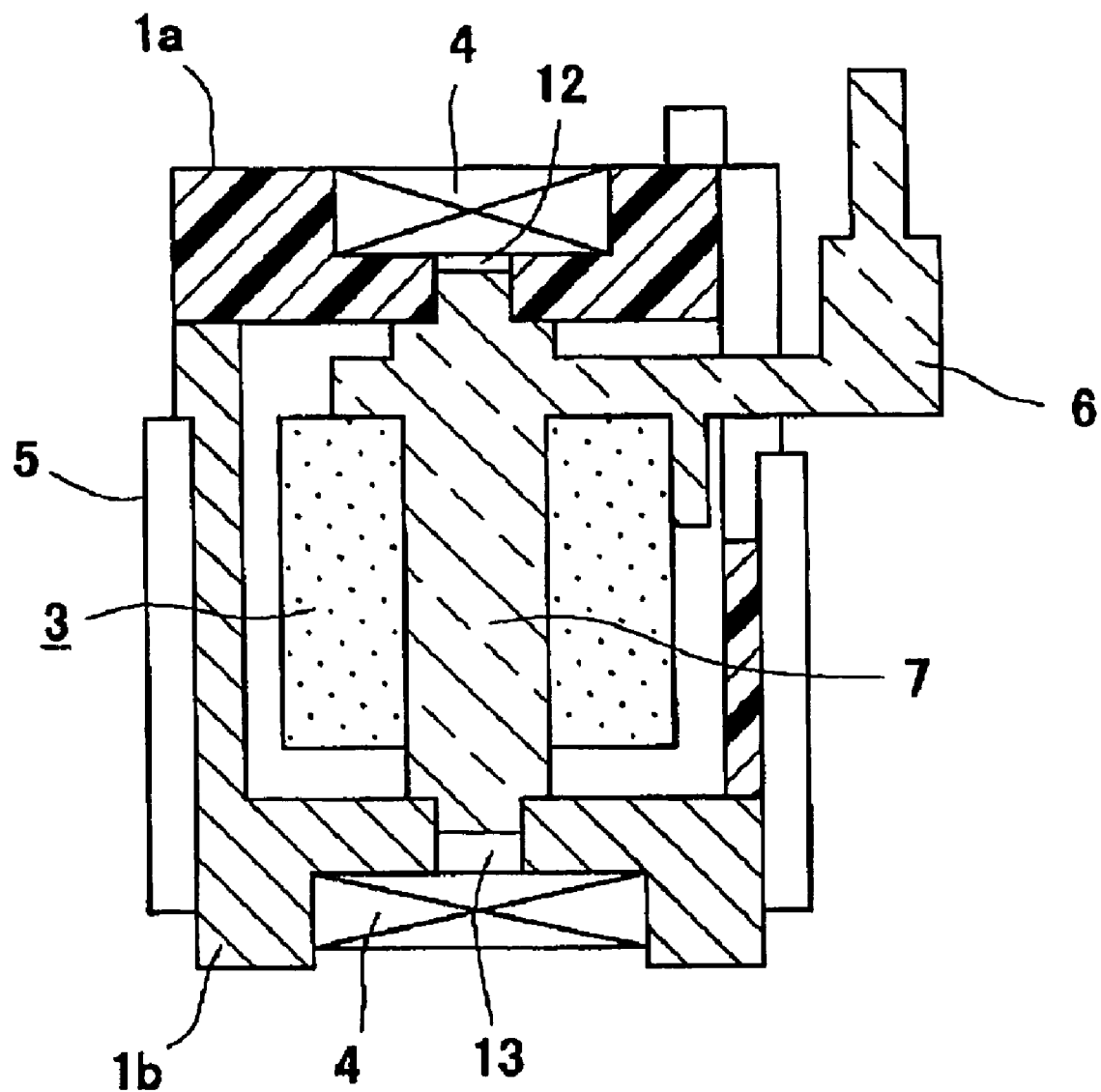
FIG. 3 is a longitudinal sectional view of the electromagnetic drive device shown in FIG. 1.

Hereunder, embodiments of the present invention will be explained with reference to the accompanying drawings. FIG. 1 is a perspective view showing a main part of an electromagnetic drive device according to the invention. FIG. 2 is an exploded perspective view thereof, and FIG. 3 is a longitudinal sectional view thereof.

The electromagnetic drive device comprises a coil frame 1 with a hollow tubular shape; a magnet rotor 3 rotatably supported in a cavity part 2 of the coil frame 1; a coil 4 wound around an outer periphery of the coil frame 1; a transmission arm 6 attached to the magnet rotor for transmitting a rotation of the rotor to an outside, and a yoke 5 for magnetically covering the outer periphery of the coil frame 1. The coil frame 1 is formed in the hollow tubular shape having the cavity part 2 for accommodating the magnet rotor 3 (described later), and is usually formed of a synthetic resin with a resin molding.

As shown in FIG. 2, the coil frame 1 is formed of cylindrical bobbin members 1a and 1b, and is divided up and down in a direction perpendicular to an axial direction, so that it is easy to form the cavity part 2 in the bobbin members 1a and 1b, and to incorporate the magnet rotor 3 into the cavity part 2.

The bobbin members 1a and 1b may be formed in a cup shape divided up and down into two portions from the middle of a hollow circular cylinder shape. In the embodiment, the bobbin member 1a has a reverse L-shape section and the bobbin member 1b has an L-shape section. That is, the bobbin member 1a has a cylindrical upper end surface 8 and a bisected peripheral side surface 10 extending from the upper end surface downwardly, and the bobbin member 1b has a lower end surface 9 and a bisected peripheral side surface 11 extending from the lower end surface upwardly.

The bobbin members 1a and 1b abut against each other at connection surfaces 10a and 11a of end edges of the peripheral side surfaces. Also, a connection surface 8a of the upper end surface abuts against a connection surface 11b of the peripheral side surface, and a connection surface 9a of the lower end surface abuts against a connection surface 10b of the peripheral side surface, respectively. The bobbin members 1a and 1b have the reverse L-shape section and the L-shape section to reduce a positional misalignment through enlarged areas of the connection surfaces (abutting faces) when the bobbin members are joined, thereby facilitating an assemblage operation.

Note that when the bobbin members 1a and 1b have a cup shape by dividing at the middle of a cylindrical shape, it is necessary to join the bobbin members carefully in a case that the bobbin members have a small outer diameter.

The magnet rotor 3 is formed of a cylindrical permanent magnet 3a integrated with a rotational shaft 7. The permanent magnet 3a is formed in a cylindrical shape through sintering a magnetic material, and the rotational shaft 7 is inserted into a fitting hole provided in a center of the permanent magnet 3a. The permanent magnet is polarized in two poles N and S, and the N pole and the S pole are opposed in a left to right direction in FIG. 2. Accordingly, when the coil is wound in a direction intersecting the poles and a current is supplied to the coil, the magnet rotor is attracted or repelled through a magnetic field generated in the coil, thereby rotating the permanent magnet by a predetermined angle.

In the embodiment, the transmission arm 6 is integrated with the rotational shaft 7 of the magnet rotor 3. The transmission arm 6 may be molded separately from the rotational shaft 7, and attached to the rotational shaft 7 with an adhesive and the like. The transmission arm 6 is integrated with a bonding piece 6a fixed to an outer peripheral surface of the permanent magnet 3a with an adhesive.

The coil frame 1 is provided with bearing parts 12 and 13 in the cavity part 2 for supporting the magnet rotor 3 to be rotatable. The bearing parts are formed of a bearing hole 12 provided in a center of the upper end surface of the bobbin member 1a and a bearing hole 13 provided in a center of the lower end surface of the bobbin member 1b. The bearing holes 12 and 13 are integrally molded in the bobbin member 1a and 1b for supporting both end parts 7a and 7b of the rotational shaft 7.

An opening 14 is provided in at least one of the bobbin members for protruding the transmission arm 6 to an outside through the peripheral side surface 10 of the coil frame 1. In a case that the transmission member 6 engages one portion of a blade member (described later) for transmitting the rotation of the magnet rotor 3, the opening 14 is provided in one of the bobbin members. In a case that the transmission member engages two portions of the blade member, the opening 14 is provided in both of the bobbin members. The opening 14 is provided in a peripheral side surface 10 different from the connection surfaces 10a, 11a, 8a, 11b, 9a and 10b of the bobbin members 1a and 1b.

Accordingly, when the bobbin members 1a and 1b are joined and the magnet rotor 3 is disposed in the cavity part 2, the transmission arm 6 protrudes to the outside through the opening 14. At this time, the end parts 7a and 7b of the rotational shaft 7 of the magnet rotor 3 are fitted into the bearing parts (holes) 12 and 13. The bobbin members 1a and 1b have the reverse L-shape section and the L-shape section, and the transmission arm 6 is inserted into the opening 14 from a direction perpendicular to the axis, so that an assembly is easy.

On the other hand, in a case that the bobbin members 1a and 1b are formed in a cup shape, the transmission arm 6 is inserted into the opening 14 while the rotor is slanted in a gap between the cavity part 2 and the magnet rotor 3. In this case, it is necessary to provide the opening 14 at a location close to the connection surfaces of the bobbin members 1a and 1b.

A concave groove 15 is formed in the coil frame 1 surrounding a circumference of the magnet 3a in a direction crossing the magnetic poles of the magnet rotor 3 accommodated in the coil frame 1, and the coil 4 is wound around the concave groove 15. A pin is provided for fixing an end of a coil wire. The yoke 5 is formed of a soft magnetic material and is fitted to the coil frame 1 to cover the outer periphery of the coil frame 1 for shielding a leakage magnetic flux.

Figure 4:
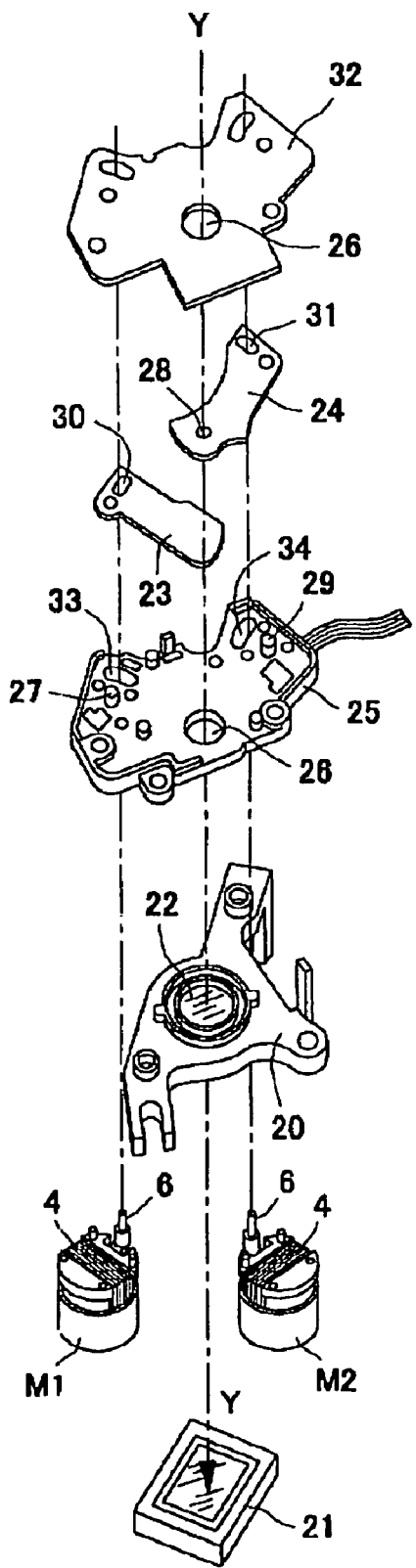
FIG. 4 is an exploded perspective view showing a light quantity adjustment device according to an embodiment of the invention.

A light quantity adjustment device for a camera with the electromagnetic drive device will be explained next with reference to FIG. 4. The light quantity adjustment device is used in a digital camera, in which an image of a subject is formed on an image pick-up element in a lens-barrel to obtain an image as an electric signal. A lens unit 20 and an image pick-up element 21 are disposed in a housing body (not shown) with a predetermined distance, and an image is formed on the image pick-up element 21 through a lens 22 of the lens unit 20.

A shutter blade 23 for blocking light and a stop blade 24 for adjusting a quantity of light according to a photographing condition are disposed on an optical axis Y—Y extending from the subject to the image pick-up element 21. The electromagnetic drive device M controls the blades 23 and 24 to open and close through the following configuration.

The shutter blade 23 and the stop blade 24 are incorporated to a base plate 25 attached to the lens unit 20. The base plate 25 is formed of a synthetic resin with a resin molding, and is provided with an optical axis aperture 26 along with the photographing axis Y—Y. The shutter blade 23 is formed of a single piece or a combination of several blades, and is arranged to have a tip part facing the optical axis aperture 26 and a base end part rotatably supported on a pin 27. Accordingly, when the blade 23 rotates about the pin 27, the optical axis aperture 26 is opened and closed.

The stop blade 24 is formed of a single piece or a combination of several blades. In the embodiment, one blade 24 is provided with a stop aperture 28 with a diameter smaller than that of the optical axis aperture at a tip part thereof. A base end part of the blade 24 is rotatably supported on a pin 29 provided in the base plate 25.

Accordingly, in a state that the blade 24 is retracted to a position away from the optical axis aperture 26, the optical aperture 26 is fully opened. In a state that the blade 24 is located on the optical axis aperture 26, the optical axis aperture 26 is covered and the stop aperture 28 creates a small stop condition.

A slit 30 is formed in the shutter blade 23 and a slit 31 is formed in the stop blade 24, respectively, for engaging the transmission arms of the electromagnetic drive devices M. A presser plate 32 formed of a metal plate is attached to the base plate 25 for covering the base plate 25 after the blades 23 and 24 are incorporated.

The electromagnetic drive device M1 is attached to a back surface of the base plate 25 with the blades 23 and 24 incorporated therein for driving the shutter blade 23 to open and close. The electromagnetic drive device M2 is also attached to the back surface of the base plate 25 with the blades 23 and 24 incorporated therein for driving the stop blade 24 to open and close. The transmission arms 6 engage the slit 30 of the shutter blade 23 and the slit 31 of the stop blade 24 through long holes 33 and 34 of the base plate 25, respectively.

In such a configuration, the electromagnetic drive devices M1 and M2 for the shutter blade 23 and the stop blade 24 are positioned at initial positions (home position) with a spring or magnet means such as an iron piece. In a case of using the spring, the spring is placed between the base plate 25 and the shutter blade 23 so that the shutter blade 25 is urged toward a close position of the optical axis aperture 26. Also, the spring is placed between the base plate 25 and the stop blade 24 so that the stop blade 24 is urged toward a position retracted from the optical axis aperture 26.

In a case of using the magnetic means, a magnetic member such as an iron piece is attached to the base plate 25, so that the permanent magnet 3*a* of the magnet rotor 3 is attracted to the magnetic member to thereby hold the blades at the home position. When a direct current is supplied to the coil 4, the magnet rotor 3 rotates in a predetermined direction through the magnetic field generated in the coil, and when a reverse current is supplied, the magnet rotor 3 rotates in a reverse direction and returns to the home position.

An operation of the electromagnetic drive device used for the light quantity adjustment device such as the shutter blade 23 and the stop blade 24 of a camera device will be explained next. When a power switch of the camera device is turned on, a current is supplied to the electromagnetic drive device M1 for the shutter blade 23 upon a signal. The shutter blade 23 moves to an open position from a close position (home position) closing the optical axis aperture 26, so that light from the subject reaches the image pick-up element 21 through the lens unit 20.

The image pick-up element 21 converts an exposure value photoelectrically, so that a control circuit determines the exposure. In a case of overexposure, the direct current is supplied to the coil 4 of the electromagnetic drive device M2 for the stop blade 24. The magnet rotor 3 rotates in a predetermined direction with the magnetic field generated in the coil 4, and the rotation is transmitted to the stop blade 24 through the transmission arm 6. The blade 24 moves toward the optical axis aperture 26 from the home position retracted from the optical axis aperture 26, and the stop aperture 28 regulates a quantity of light passing through the photographing optical axis Y—Y. Then, when a release button is operated, the control circuit resets a charged electric charge of the image pick-up element 21 to start photographing. After a predetermined exposure time, the control circuit cuts the current supply to the drive device for the shutter blade 23. As a result, the shutter blade 23 closes the optical axis aperture with the close spring.

The electric charge photoelectrically converted in the image pick-up element 21 is sequentially accumulated in a shift register and the like with a clock signal, and an image of the subject is stored as electric information. Incidentally, when a film is used in place of the image pick-up element, the image is recorded in a silver halide film as a usual still photograph.

As described above, in the present invention, the hollow tubular coil frame is formed of the two bobbin members divided up and down in the direction perpendicular to the rotational shaft of the magnet rotor. The opening is provided in one of the bobbin members in the peripheral side surface different from the connection surface contacting the other bobbin member. The transmission arm is arranged in the direction perpendicular to the rotational shaft, and protrudes to the outside from the opening.

The present invention provide the following advantages as compared with a conventional device in which a connection surface is formed at a part of an end surface of a bobbin member bisected up and down and an opening window is formed at a remaining part for a transmission arm.

Even when the device has a coil frame with a small diameter, the bobbin members are connected over the whole outer periphery areas, so that it is easy to join the bobbin members without the positional misalignment. The opening for the transmission arm is formed in the peripheral side surface of the bobbin member in the window shape. Accordingly, even if the coil is contracted due to a change in an ambient temperature or an impact is applied to the coil, the opening does not deform, so that the operational range of the transmission member is not reduced and the motion of the transmission member is not hindered.

While the invention has been explained with reference to the specific embodiments of the invention, the explanation is illustrative and the invention is limited only by the appended claims.

What is claimed is:

1. An electromagnetic drive device comprising:
    a coil frame with a hollow tubular shape including two bobbin members separated and joined perpendicular to an axial direction thereof,
    a magnet rotor having a rotational shaft and disposed in the coil frame to be rotatable through the rotational shaft,
    a transmission arm attached to the rotational shaft for transmitting a rotation of the magnet rotor to an outside of the coil frame, said transmission arm extending substantially perpendicular to the rotational shaft,
    a coil wound around an outer periphery of the coil frame, and
    an opening formed in one of the bobbin members in a peripheral side surface different from portions contacting the other of the bobbin members so that the transmission arm protrudes to an outside through the opening.

2. An electromagnetic drive device according to claim 1, wherein one of said bobbin members includes a first bearing part for supporting one end of the rotational shaft, and the other of said bobbin members includes a second bearing part for supporting the other end of the rotational shaft.

3. An electromagnetic drive device according to claim 1, wherein one of said bobbin members includes an upper end surface and a first peripheral side surface, and the other of said bobbin members includes a lower end surface and a second peripheral side surface, said first peripheral side surface being attached to the second peripheral side surface along the longitudinal direction.

4. A light quantity adjustment device comprising the electromagnetic drive device according to claim 1, a base plate attached to the electromagnetic drive device and having an optical axis aperture, and a blade member supported on the base plate and attached to the transmission arm for adjusting a quantity of light passing through the optical axis aperture.

5. A light quantity adjustment device according to claim 4, wherein one of said bobbin members includes an upper end surface and a first peripheral side surface, and the other of said-bobbin members includes a lower end surface and a second peripheral side surface, said first peripheral side surface being attached to the second peripheral side surface along the longitudinal direction.

* * * * *